(12) United States Patent
Wang et al.

(10) Patent No.: US 11,290,755 B2
(45) Date of Patent: Mar. 29, 2022

(54) SIGNALING DATA FOR PREFETCHING SUPPORT FOR STREAMING MEDIA DATA

(71) Applicant: QUALCOMM Incorporated, San Diego, CA (US)

(72) Inventors: Ye-Kui Wang, San Diego, CA (US); Thomas Stockhammer, Bergen (DE)

(73) Assignee: Qualcomm Incorporated, San Diego, CA (US)

( * ) Notice: Subject to any disclaimer, the term of this patent is extended or adjusted under 35 U.S.C. 154(b) by 18 days.

(21) Appl. No.: 15/862,251

(22) Filed: Jan. 4, 2018

(65) Prior Publication Data

US 2018/0199075 A1    Jul. 12, 2018

Related U.S. Application Data

(60) Provisional application No. 62/444,730, filed on Jan. 10, 2017.

(51) Int. Cl.
*H04N 21/2343* (2011.01)
*H04N 21/262* (2011.01)
(Continued)

(52) U.S. Cl.
CPC ..... *H04N 21/2343* (2013.01); *H04L 65/4084* (2013.01); *H04L 65/607* (2013.01);
(Continued)

(58) Field of Classification Search
CPC ................. H04N 21/2343; H04L 65/607–608
See application file for complete search history.

(56) References Cited

U.S. PATENT DOCUMENTS 9,282,354 B2    3/2016 Lo et al.
10,062,414 B1 *  8/2018 Westphal ............. G11B 27/031
(Continued)

FOREIGN PATENT DOCUMENTS

CN    101242430 A    8/2008
CN    101951395 A    1/2011
(Continued)

OTHER PUBLICATIONS

Fielding R., et al., "Hypertext Transfer Protocol—HTTP/1.1 ," Network Working Group; RFC 2616, Jun. 1999, 200 pp.
(Continued)

*Primary Examiner* — Brian T Pendleton
*Assistant Examiner* — Frank Johnson
(74) *Attorney, Agent, or Firm* — Shumaker & Sieffert, P.A.

(57) ABSTRACT

A media device pre-fetches media data that is likely to be retrieved. An example media device includes a memory for storing media data, and one or more processors implemented in circuitry and configured to receive information indicating at least one data structure of a plurality of data structures that is likely to be retrieved by a plurality of user devices operated by a respective plurality of users, the data structure including media data, and retrieve the media data of the data structure before receiving requests for the media data from the user devices. The information may be included in, e.g., a manifest file, a special Parameters Enhancing Delivery (PED) message, and/or a separate track of a video file multiplexed with other tracks of the video file.

37 Claims, 6 Drawing Sheets

(51) Int. Cl.

| | |
|---|---|
| *H04L 65/60* | (2022.01) |
| *H04L 65/65* | (2022.01) |
| *H04L 65/612* | (2022.01) |
| *H04N 21/433* | (2011.01) |
| *H04N 21/4402* | (2011.01) |
| *H04N 21/84* | (2011.01) |
| *H04N 21/854* | (2011.01) |
| *H04N 21/643* | (2011.01) |
| *H04N 21/845* | (2011.01) |
| *H04L 67/02* | (2022.01) |

(52) U.S. Cl.
CPC ..... *H04L 65/608* (2013.01); *H04N 21/23439* (2013.01); *H04N 21/4331* (2013.01); *H04N 21/44029* (2013.01); *H04N 21/64322* (2013.01); *H04N 21/84* (2013.01); *H04N 21/8456* (2013.01); *H04N 21/85406* (2013.01); *H04L 67/02* (2013.01)

(56) References Cited

U.S. PATENT DOCUMENTS

| | | | |
|---|---|---|---|
| 2004/0010613 | A1 | 1/2004 | Apostolopoulous et al. |
| 2008/0214176 | A1* | 9/2008 | Amon ............ H04N 21/234327 455/422.1 |
| 2009/0183215 | A1 | 7/2009 | McCartie et al. |
| 2010/0064327 | A1 | 3/2010 | Lynch et al. |
| 2013/0097309 | A1* | 4/2013 | Ma ...................... H04L 67/2847 709/224 |
| 2013/0144979 | A1* | 6/2013 | Kansal ............. H04N 21/23106 709/219 |
| 2014/0026052 | A1* | 1/2014 | Thorwirth ................. G06F 3/01 715/721 |
| 2014/0089467 | A1* | 3/2014 | Beck ....................... H04L 67/02 709/219 |
| 2014/0092963 | A1 | 4/2014 | Wang et al. |
| 2014/0223502 | A1* | 8/2014 | Doblmaier ......... H04N 21/4384 725/93 |
| 2014/0347177 | A1* | 11/2014 | Phan .............. H04N 21/234336 340/407.1 |
| 2014/0365613 | A1* | 12/2014 | Phillips .................. H04L 65/60 709/219 |
| 2015/0089023 | A1* | 3/2015 | Phillips ................ H04L 65/4084 709/219 |
| 2015/0127845 | A1* | 5/2015 | Phillips ............ H04N 21/26258 709/231 |
| 2016/0127440 | A1* | 5/2016 | Gordon ............ H04N 21/23439 709/219 |
| 2016/0149978 | A1* | 5/2016 | Wissingh ........... H04N 21/8456 709/231 |
| 2016/0182941 | A1* | 6/2016 | Crabtree .......... H04N 21/23106 725/115 |
| 2016/0307596 | A1* | 10/2016 | Hardin .................. H04L 65/602 |
| 2016/0373546 | A1 | 12/2016 | Lotfallah et al. |
| 2017/0084086 | A1* | 3/2017 | Pio ....................... H04N 21/816 |
| 2017/0118540 | A1* | 4/2017 | Thomas ............. H04N 21/2343 |
| 2017/0251204 | A1 | 8/2017 | Gupte et al. |
| 2017/0339415 | A1 | 11/2017 | Wang et al. |
| 2017/0339416 | A1 | 11/2017 | Hendry et al. |
| 2017/0344843 | A1 | 11/2017 | Wang et al. |
| 2018/0020244 | A1* | 1/2018 | Oh ........................... H04N 7/08 |
| 2018/0035147 | A1* | 2/2018 | DeVreese ........... H04L 65/4084 |
| 2018/0139254 | A1* | 5/2018 | Oyman ............... H04L 67/2842 |
| 2020/0053394 | A1* | 2/2020 | Shiraishi ............. H04N 21/236 |

FOREIGN PATENT DOCUMENTS

| | | |
|---|---|---|
| CN | 104486350 A | 4/2015 |
| CN | 104618506 A | 5/2015 |
| WO | 2009091729 | 7/2009 |
| WO | 2013063483 | 5/2013 |
| WO | 2015197815 A1 | 12/2015 |
| WO | WO-2016111563 A1 | 7/2016 |
| WO | 2016204815 A1 | 12/2016 |

OTHER PUBLICATIONS

ITU-T H.265, Series H: Audiovisual and Multimedia Systems, Infrastructure of audiovisual services—Coding of moving video. High efficiency video coding, The International Telecommunication Union, Apr. 2015, 634 pp.

Kuzyakov E., "Next-generation video encoding techniques for 360 video and VR," Jan. 21, 2016 (Jan. 21, 2016), XP055387524, pp. 3 pages. Retrieved from the Internet: URL:https:/tcode.facebook.com/posts/1126354007399553/next-generation-video-encodingtechniques-for-360-video-and-vr/ [retrieved on Jul. 4, 2017] the whole document.

Lee J.,et al., "Additional Requirements for Omnidirectional Media Format," Motion Picture Expert Group or ISO/IEC JTC1/SC29/WG11, 114. MPEG Meeting San Diego; M37819, Feb. 17, 2016 (Feb. 17, 2016), XP030066185, pp. 2 pages.

Wang Y.,et al., "Signalling of most-interested regions of VR video," Motion Picture Expert Group or ISO/IEC JTC1/SC29/WG11,115. MPEG Meeting, Geneva; M-38559, May 25, 2016 (May 25, 2016), XP030066916, pp. 1-3.

Boyce et al., "JVET common test conditions and evaluation procedures for 360 video," Joint Video Exploration Team (JVET) of ITU-T SG 16 WP 3 and ISO/IEC JTC 1/SC 29/WG 11, Oct. 15-21, 2016, document No. JVET-D1030_v1, Dec. 14, 2016, 6 pp.

Fielding et al., "Hypertext Transfer Protocol—HTTP/1.1," Network Working Group, RFC 2616, The Internet Society, Jun. 1999, 114 pp.

3GPP TS 26.244 V12.2.0, 3rd Generation Partnership Project; Technical Specification Group Services and System Aspects; Transparent end-to-end packet switched streaming service (PSS); 3GPP file format (3GP), (Release 12), Dec. 2013, 61 pp.

"Information technology—Dynamic Adaptive Streaming over HTTP (Dash)—Part 1: Media Presentation Description and Segment Formats," ISO/IEC 23009-1, International Standard, First Edition, Apr. 1, 2012, 132 pp.

U.S. Appl. No. 15/195,439, filed by Ajit Deepak Gupte et al., filed Jun. 28, 2016.

U.S. Appl. No. 15/599,295, filed by Fnu Hendry et al., filed May 18, 2017.

"Information technology—Dynamic Adaptive Streaming over HTTP (Dash)—Part 1: Media Presentation Description and Segment Formats," ISO/IEC 23009-1, International Standard, Draft third edition, Jan. 9, 2017, 216 pp.

"Information technology—Coding of audio—visual objects" Part 12: ISO base media file format, ISO/IEC 14496-12 International Standard, Fifth edition, Feb. 20, 2015, 208 pp. [uploaded in parts].

"Information technology—JPEG 2000, image coding syste," Part 12: ISO base media file format, ISO/IEC 15444-12, fifth edition, Feb. 20, 2015, 286 pp.

"Information technology—Coding of audio-visual ojects—Part 15: Carriage of network abstraction layer (NAL) unit structured video in the ISO base media file format" Jan. 13, 2014, ISO/IEC JTC/SC; ISP/IEC FDIS 14496-15:2014 (E);195 pp.

"Information technology—Coding of audio-visual ojects—Part 15: Carriage of network abstraction layer (NAL) unit structured video in the ISO base media file format" Jan. 13, 2014, ISO/IEC JTC/SC; ISO/IEC FDIS 14496-15:2014 (E); 179 pp.

International Search Report and Written Opinion from International Application No. PCT/US2018/012600, dated Mar. 27, 2018, 16 pp.

Thomas et al., "Enchancing MPEG Dash Performance via Server and Network Assistance," IBC 2015 Coonfernce, Sep. 11-15, 2015, 8 pp.

Lee et al., "Spherical coordinate metadata for ROI of VR video in ISO BMFF," MPEG Meeting; Oct. 17-21, 2016, Oct. 12, 2016, 3 pp. Information Technology—Dynamic adative streaming over HTTP (DASH)—Part 5: server and network assisted DASH (SAND), ISO/IEC JTC 1/SC 29, N154854; Feb. 19, 2015, 55 pp.

Wang, et al., "Signalling for data prefetching in DASH," MPEG Meeting; Jan. 16-20, 2017, No. m39981, Jan. 11, 2017, 3 pp.

(56) References Cited

OTHER PUBLICATIONS

Wang, et al., "DASH: Data prefetching signalling," MPEG Meeting, Apr. 3-7, 2017, No. m40383, Mar. 28, 2017, 6 pp.
Paila, et al., "FLUTE—File Delivery over Unidirectional Transport," Internet Engineering Task Force, Request for Comments, RFC 6726, Nov. 2012, 46 pp.
Response to Written Opinion filed in International Application No. PCT/US2018/012600 dated Nov. 9, 2018, 4 pp.
Second Written Opinion from International Application No. PCT/US2018/012600, dated Nov. 29, 2018, 6 pp.
International Preliminary Report on Patentability from International Application No. PCT/US2018/012600, dated Feb. 28, 2019, 18 pp.
Junqing Z, et al., "Research of Proxy Caching and Prefetching for Streaming Media," Microcomputer Development, vol. 15, No. 7, Jul. 10, 2005.
Giladi A., et al., "Descriptions of Core Experiments on DASH Amendment," 3GPP ISO/IEC JTC1/SC29/WG11, MPEG2014/N14858, Oct. 24, 2014, Strasbourg, FR, pp. 1-26.

\* cited by examiner

SIGNALING DATA FOR PREFETCHING SUPPORT FOR STREAMING MEDIA DATA

This Application claims the benefit of U.S. Provisional Application No. 62/444,730, filed Jan. 10, 2017, the entire contents of which are hereby incorporated by reference.

TECHNICAL FIELD

This disclosure relates to transport of encoded media data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by ITU-T H.261, ISO/IEC MPEG-1 Visual, ITU-T H.262 or ISO/IEC MPEG-2 Visual, MPEG-2, MPEG-4, ITU-T H.263 or ITU-T H.264/MPEG-4 Visual, Part 10, Advanced Video Coding (AVC), ITU-T H.265 (also referred to High Efficiency Video Coding (HEVC) and ISO/IEC 23008-2), and extensions of such standards such as Scalable Video Coding (SVC) and Multiview Video Coding (MVC), to transmit and receive digital video information more efficiently. HEVC extensions include its scalable coding extension (i.e., scalable high-efficiency video coding, SHVC) and multiview extension (i.e., multiview high efficiency video coding, MV-HEVC).

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes techniques for signaling information indicating that certain data is more likely to be used than other data, e.g., during streaming or other transport of the data. Such information can be used for data prefetching by client devices or intermediate network elements between clients and an origin server in adaptive streaming systems. In particular, a media device may use the techniques of this disclosure to pre-fetch the data that is more likely to be used.

In one example, a method of retrieving media data includes receiving, by a media device, information indicating at least one data structure of a plurality of data structures that is likely to be retrieved by a plurality of user devices operated by a respective plurality of users, the data structure including media data, and retrieving, by the media device, the media data of the data structure before receiving requests for the media data from the user devices.

In another example, a media device for retrieving media data includes a memory for storing media data, and one or more processors implemented in circuitry and configured to receive information indicating at least one data structure of a plurality of data structures that is likely to be retrieved by a plurality of user devices operated by a respective plurality of users, the data structure including media data, and retrieve the media data of the data structure before receiving requests for the media data from the user devices.

In another example, a media device for retrieving media data includes means for receiving information indicating at least one data structure of a plurality of data structures that is likely to be retrieved by a plurality of user devices operated by a respective plurality of users, the data structure including media data, and means for retrieving the media data of the data structure before receiving requests for the media data from the user devices.

In another example, a computer-readable storage medium has stored thereon instructions that, when executed, cause a processor of a media device to receive information indicating at least one data structure of a plurality of data structures that is likely to be retrieved by a plurality of user devices operated by a respective plurality of users, the data structure including media data, and retrieve the media data of the data structure before receiving requests for the media data from the user devices.

The details of one or more examples are set forth in the accompanying drawings and the description below. Other features, objects, and advantages will be apparent from the description and drawings, and from the claims.

DETAILED DESCRIPTION

Figure 1:
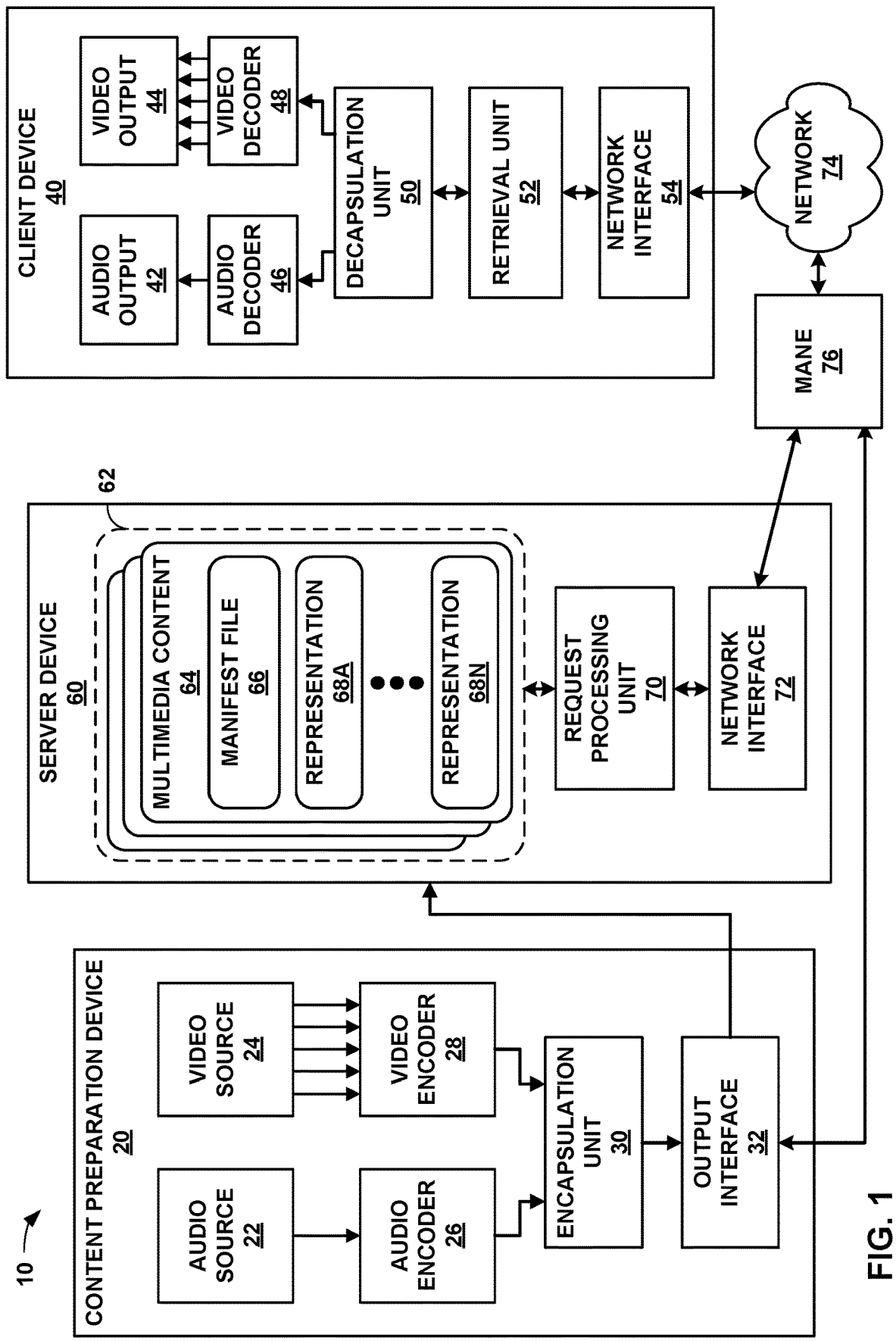
FIG. 1 is a block diagram illustrating an example system that implements techniques for streaming media data over a network.

In general, this disclosure describes techniques for signaling data for prefetching support for streaming media data, such as using Dynamic Adaptive Streaming over HTTP (DASH). DASH is described in, e.g., 3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 12) (December 2013). DASH is also specified in Information technology—Dynamic adaptive streaming over HTTP (DASH)—Part 1: Media presentation description and segment formats, ISO/IEC 23009-1 (Apr. 1, 2012).

Although discussed primarily with respect to DASH for purposes of explanation and example, it should be understood that these techniques may be applied to other streaming technologies. For example, the techniques of this disclosure may be performed in conjunction with Apple HTTP Live Streaming (HLS) or Common Media Application Format (CMAF). The techniques of this disclosure may also be performed in conjunction with Microsoft Smooth Streaming.

As discussed in greater detail below, streaming media protocols often involve transmitting a manifest file from a server device to a client device, where the manifest file describes characteristics of a corresponding media presentation. For example, in DASH, a media presentation description (MPD) describes adaptation sets including switchable representations. Each of the representations includes a plurality of segments, that is, individually retrievable files (which may be associated with a corresponding uniform resource locator (URL)).

The techniques of this disclosure generally include signaling information indicating which data structure of a plurality of data structures is most likely to be retrieved (e.g., by a user device), such that a media device can pre-fetch media data of the data structure. For example, the data structure may be a particular media presentation (e.g., a particular movie title), a particular adaptation set of a media presentation, a representation of a media presentation, or even a set of segments of a representation. The information may form part of a manifest file (such as an MPD) at the manifest file level or at a representation or adaptation set level (e.g., within the MPD). Additionally or alternatively, the information may be signaled as side information separately from the manifest file, e.g., for intermediate network devices, such as media aware network elements (MANEs) or DASH aware network elements (DANEs).

As noted above, segments in DASH are examples of individually retrievable files. In general, such files may be formatted according to ISO Base Media File Format (ISOBMFF) or an extension to ISOBMFF. The techniques of this disclosure may be applied to video files conforming to video data encapsulated according to any of ISO BMFF, Scalable Video Coding (SVC) file format, Advanced Video Coding (AVC) file format, Third Generation Partnership Project (3GPP) file format, and/or Multiview Video Coding (MVC) file format, or other similar video file formats.

File format standards include ISO base media file format (ISOBMFF, ISO/IEC 14496-12), and other standards derived from the ISOBMFF, including MPEG-4 file format (ISO/IEC 14496-15), 3GPP file format (3GPP TS 26.244) and file formats for AVC and HEVC families of video codecs (ISO/IEC 14496-15). The draft texts of editions for ISO/IEC 14496-12 and 14496-15 are available at phenix.int-evry.fr/mpeg/doc_end_user/documents/111_Geneva/wg11/w15177-v6-w15177.zip and wg11.sc29.org/doc_end_user/documents/115_Geneva/wg11/w16169-v2-w16169.zip, respectively. The ISOBMFF is used as the basis for many codec encapsulation formats, such as the AVC file format, as well as for many multimedia container formats, such as the MPEG-4 file format, the 3GPP file format (3GP), and the digital video broadcast (DVB) file format.

In addition to continuous media, such as audio and video, static media, such as images, as well as metadata can be stored in a file conforming to ISOBMFF. Files structured according to the ISOBMFF may be used for many purposes, including local media file playback, progressive downloading of a remote file, segments for DASH, containers for content to be streamed and its packetization instructions, and recording of received real-time media streams.

A box is an elementary syntax structure in the ISOBMFF, including a four-character coded box type, a byte count for the box, and a payload. An ISOBMFF file includes a sequence of boxes, and boxes may contain other boxes. A Movie box ("moov") contains the metadata for the continuous media streams present in the file, each one represented in the file as a track. The metadata for a track is enclosed in a Track box ("trak"), while the media content of a track is either enclosed in a Media Data box ("mdat") or directly in a separate file. The media content for tracks includes a sequence of samples, such as audio or video access units.

The ISOBMFF specifies the following types of tracks: a media track, which contains an elementary media stream; a hint track, which either includes media transmission instructions or represents a received packet stream; and a timed metadata track, which comprises time-synchronized metadata. Although originally designed for storage, the ISOBMFF has proven to be very valuable for streaming, e.g., for progressive download or DASH. For streaming purposes, the movie fragments defined in ISOBMFF can be used.

The metadata for each track includes a list of sample description entries, each providing the coding or encapsulation format used in the track and the initialization data needed for processing that format. Each sample is associated with one of the sample description entries of the track.

The ISOBMFF enables specification of sample-specific metadata with various mechanisms. Specific boxes within the Sample Table box ("stbl") have been standardized to respond to common needs. For example, a Sync Sample box ("stss") is used to list the random access samples of the track. The sample grouping mechanism enables mapping of samples according to a four-character grouping type into groups of samples sharing the same property specified as a sample group description entry in the file. Several grouping types have been specified in the ISOBMFF.

In HTTP streaming, such as according to DASH, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of DASH, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more Periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

DASH is a standard for HTTP (adaptive) streaming applications. DASH mainly specifies the format of the media presentation description (MPD), an example of a manifest file, and the media segment format. The MPD describes media available on a server device and lets the DASH client autonomously download the media version at a particular media time of interest.

A typical procedure for DASH based HTTP streaming includes the following steps:
1. A client device obtains an MPD of a streaming content (media presentation), e.g., a movie. The MPD includes information on different alternative representations, e.g., bit rate, video resolution, frame rate, audio language, of the streaming content, as well as URLs of HTTP resources (an initialization segment and the media segments).
2. Based on information in the MPD and the client's local information, e.g., network bandwidth, decoding/display capabilities and user preference, the client requests the desired representation(s), one segment (or a part thereof) at a time.
3. When the client detects a network bandwidth change, it requests segments of a different representation with a better-matching bitrate, ideally starting from a segment that starts with a random access point (RAP).

During an HTTP streaming "session," to respond to the user request to seek backward to a past position or forward to a future position (also referred to as trick modes), the client device requests past or future segments starting from a segment that is close to the desired position and that ideally starts with a random access point. The user may also request to fast-forward the content (another example of a trick mode), which may be realized by requesting data sufficiently for decoding only the intra-coded video pictures or only a temporal subset of the video stream.

ISO/IEC 23009-5 specifies Server And Network assisted DASH (SAND). SAND introduces messages exchanged between DASH client devices and network elements, or between various network elements, for the purpose of improving efficiency of streaming sessions by providing information about real-time operational characteristics of networks, servers, proxies, caches, content delivery networks (CDNs), as well as DASH client's performance and status.

In SAND, a network element that has at least minimal intelligence about DASH is referred to as a DASH Aware Network Element (DANE). DANEs, for instance, may be configured to recognize DASH-formatted delivered objects, such as the MPD or DASH segments, and may prioritize, parse, or even modify such objects. A DASH origin server is also considered as a DANE.

SAND messages refer to messages exchanged between DASH clients, DANEs, and/or Metrics Servers in order to either enhance reception or delivery of DASH service, or to report status or metrics from the DASH client to DASH aware Network Elements or Metrics Servers. SAND messages are categorized into the following four types:
Parameters Enhancing Delivery (PED) messages that are exchanged between DANEs,
Parameters Enhancing Reception (PER) messages that are sent from DANEs to DASH clients,
Status messages that are sent from DASH clients to DANEs, and
Metrics messages that are sent from DASH clients to Metrics servers.

The status messages defined in SAND include an AnticipatedRequests SAND message, which allows a DASH client to announce to a DANE which specific set of segments it is interested in. The intent is to signal the set of segments in representations that the DASH client is likely to select and request soon. Currently, there are no PED messages defined in SAND.

Virtual reality (VR) is the ability to be virtually present in a non-physical world created by rendering of natural and/or synthetic images and sounds correlated by the movements of an immersed user, allowing the user to interact with that world. With recent progress made in rendering devices, such as head mounted displays (HMD), and VR video (often also referred to as 360-degree video) creation, a significant quality of experience can be offered. VR applications including gaming, training, education, sports video, online shopping, entrainment, and so on.

A typical VR system includes the following components and steps:

- A camera set, which typically includes multiple individual cameras pointing in different directions, which may collectively cover all viewpoints around the camera set.
- Image stitching, where video pictures taken by the multiple individual cameras are synchronized in the time domain and stitched in the space domain, to form a spherical video, but mapped to a rectangular format, such as equi-rectangular (like a world map) or cube map.
- The video in the mapped rectangular format is encoded/compressed using a video codec, e.g., H.265/HEVC or H.264/AVC.
- The compressed video bitstream(s) may be stored and/or encapsulated in a media format and transmitted (possibly only the subset covering only the area being seen by a user) through a network to a receiver device (i.e., a client device).
- The receiver device receives the video bitstream(s), or part thereof, possibly encapsulated in a format, and sends the decoded video signal or part thereof to a rendering device (which may form part of the same device or a separate device).
- The rendering device can be, e.g., a head mounted display (HMD), which can track head movement, and may even track eye movement, and render the corresponding part of the video such that an immersive experience is delivered to the user.

At the writing of this document, the Omnidirectional Media Application Format (OMAF) is being developed by MPEG to define a media application format that enables omnidirectional media applications, focusing on VR applications with 360-degree video and associated audio. OMAF specifies a list of projection methods that can be used for conversion of a spherical or 360-degree video into a two-dimensional rectangular video, followed by how to store omnidirectional media and the associated metadata using the ISO base media file format (ISOBMFF), and how to encapsulate, signal, and stream omnidirectional media using dynamic adaptive streaming over HTTP (DASH), and finally which video and audio codecs as well as media coding configurations can be used for compression and playback of the omnidirectional media signal. OMAF is planned to become ISO/IEC 23000-20, and its draft specification is available from wg11.sc29.org/doc_end_user/documents/116_Chengdu/wg11/w16439.zip.

There are desirable use cases of streaming media data involving generation, signaling, and use of information indicating regions of interest or most-interested regions. In MPEG contribution m37819, a use case was discussed on signaling and using information of a director's cut, such that VR playback may include display of a dynamically changing viewport that a director wants the audience to focus on, even when the user is not turning his/her head or changing the viewport through other user interfaces (UI). Such viewports may be provided with an omnidirectional video scene by scene.

U.S. application Ser. No. 15/589,782, filed May 8, 2017, published as U.S. Patent Publication No. 2017/0339415, which is incorporated herein by reference in its entirety, describes techniques for generation of information on most-interested regions from user statistics by a service or content provider, e.g., through the statistics of which regions have been requested/seen the most by users when VR video content was provided through a streaming service, wherein a most-interested region in a VR video picture is one of the regions that is statistically most likely rendered to the user at the presentation time of the picture. Also disclosed in Provisional Application No. 63/339,009 are techniques for using the information on most-interested regions for various VR performance-improving purposes, such as data pre-fetching in VR adaptive streaming by edge servers or clients, transcoding optimization when a VR video is transcoded, e.g., to a different codec or projection mapping, cache management by an edge server or cache, and content management by a VR video streaming server. Signaling of most-interested regions has also been disclosed, e.g., by using SEI messages in a video bitstream, a file format sample group in a media file, or DASH media presentation description (MPD) elements or attributes using a sample group.

U.S. application Ser. No. 14/491,805, filed May 24, 2016, published as U.S. Patent Publication No. 2017/0344843, which is incorporated herein by reference in its entirety, describes several methods for advanced signaling of one or more most-interested regions in VR video, including the following, among others:

- A sample group that, when included in a track fragment box, can document information of samples that are in subsequent track fragments following the one that contains the sample group (the SampleToGroupBox of the grouping type and the corresponding sample group description box) in the track.
- Examples of the sample group mentioned above.
- Signaling of most-interested regions directly using tile ID as specified in HEVC, groupID as defined in ISO/IEC 14496-15, track ID as defined in ISO/IEC 14496-12, or DASH representation ID as defined in ISO/IEC 23009-1.

A region of interest (ROI) in VR/360-video may be defined in at least two ways. The first example way is to define it based on a sphere coordinate system, e.g., by defining a region on the spherical surface of the 360 video. The second example way is to define an ROI based on the 2D Cartesian coordinate system on a 2D picture. The latter is what was used in above-identified U.S. Provisional Application Nos. 62/339,009 and 62/341,017.

MPEG output document N16440 mentions several methods for defining regions of interest based on the sphere coordinate system. Specifically, these methods specify a region on a spherical surface that is enclosed by the four segments of either four great circles or two great circles and two small circles, each segment between two points on the spherical surface. Herein, a circle, great circle, and small circle are defined as follows:

The intersection of a plane and a sphere is a circle (except when the intersection is a point). All the points of this circle belong to the surface of the sphere. A great circle, also known as an orthodrome or Riemannian circle, of a sphere is the intersection of the sphere and a plane that passes through the center point of the sphere. The center of the sphere and the center of a great circle are always co-located. Any other intersection of a plane and a sphere that does not meet this condition, and that is not a point, is a small circle.

When a VR/360 video is played back on a head mounted display (HMD) or a non-HIVID display such as a TV, a viewport is rendered to the user. Typically, a viewport is a rectangular region on a plane that is tangent to a sphere (i.e., intersects with the sphere at one point), where the viewport plane is orthogonal to the user's viewing direction. A viewport can be generated by applying the rectilinear projection, e.g., as discussed in J. Boyce, E. Alshina, A. Abbas, Y. Ye, "JVET common test conditions and evaluation procedures for 360° video," Joint Video Exploration Team of ITU-T SG16WP3 and ISO/IEC JTC1/SC29/WG11, JVET-D1030, 4th Meeting, October 2016.

The region on the sphere that corresponds to a viewport is the one that is enclosed by the four segments of four great circles.

Other techniques for dual signaling of one or more most-interested regions in VR video include signaling one based on a region on the spherical surface, and the other based on a region on the decoded picture.

The techniques of this disclosure may be applied to address certain problems that may arise relating to signaling of regions of interest, e.g., in VR and/or in media streaming techniques. The AnticipatedRequests SAND message may be used by a DASH client to announce to a DANE which specific set of segments it is interested in, and to signal the set of segments in representations that the DASH client is likely to select and request soon. This SAND message is suitable in scenarios wherein the DASH client is participating in a DASH streaming session and it has a good estimation of which segments are likely to be wanted to be rendered to the user based on real-time status of the client and user behaviors in addition to other related information available to the client.

The information of which regions in a VR video comprising the director's cut, or other most-interested regions as indicated through analysis of statistics, may apply to an entire VR video content. Such information may be used by the DASH client, in addition to the real-time status of the client and user behaviors, to determine which segments are to be included in an AnticipatedRequests SAND message during a DASH streaming session. Such information, if present as file format metadata, may be directly accessed by the DASH client. However, this requires the DASH client to parse file format metadata in addition to the MPD, and may also require the DASH client to apply a geometric process for the projection and region-wise packing used for generation of the pictures before encoding for VR video.

In addition, the above information (of which regions in a VR video comprise the director's cut, or other most-interested regions by statistics) may also be used by a DANE (the origin server and/or a cache or CDN element) to prefetch all Segments of the DASH Representations that comprise the director's cut or most-interested regions. Due to its real-time nature and its being a status message originated only from the DASH client, the AnticipatedRequests SAND message is not suitable for communicating such information to DANEs.

Yet another problem associated with conventional designs for communicating director's cut or most-interested regions to DANEs is that there can be different levels of interests or probabilities of the regions of interest.

Yet another problem with using the anticipated requests is that client devices need to support SAND. However, many client devices do not support SAND. In addition, the anticipated requests typically only address short-term dependencies for a single client, possibly even creating a state of the client with the MANE or DANE.

Furthermore, there may be different levels of interest or usage rates for different contents on content level. For example, some movies or titles are much more consumed by users than others. The current DASH design does not provide for signaling of such information, which may also be used for prefetching the most consumed contents.

FIG. 1 is a block diagram illustrating an example system 10 that implements techniques for streaming media data over a network. In this example, system 10 includes content preparation device 20, server device 60, media aware network element (MANE) 76, and client device 40. Client device 40, MANE 76, content preparation device 20, and server device 60 are communicatively coupled by network 74, which may comprise the Internet. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as fixed-function and/or programming processing circuitry, which may include one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

In accordance with the techniques of this disclosure, a media device, such as client device 40, may receive signaled information on what data structures (e.g., representations, adaptation sets, media presentations, segments, or the like) are expected to be of more interest for users than others. Media data is typically referred to as "content," but the content popularity may be translated into DASH delivery structures that are easily handled by HTTP network elements, such as server device 60, client device 40, content preparation device 20, and other devices (such as MANEs or DANEs). If the content provider (e.g., content preparation device 20 or server device 60) provides such data, such information can be used for data prefetching by client device 40 or intermediate network elements within network 74 (not shown in the example of FIG. 1) between client devices and origin server devices in adaptive streaming systems, such as system 10. Such information may also be used, for example, to deliver data that is considered most relevant on a preferred data link, for example, on multicast or broadcast, whereas less popular data may only be provided in unicast from the origin server (e.g., server device 60). Client device 40 or an intermediate network device of network 74 may also prefetch expected-to-be-popular data in higher quality, in order to ensure that such data is available in good quality to many users. One or more of these techniques may be applied independently, or in combination with others.

In one example, server device 60 provides MPD-level signaling in manifest file 66 that indicates content-level or manifest-file-level (e.g., MPD-level) relative consumption or request rate among different contents of storage medium 62. For example, the indication may have no unit, and a greater value may indicate a higher likelihood or probability of a Representation (e.g., one of representations 68) or Adaptation Set of the Media Presentation being consumed/requested. This information may be used by DANEs to prefetch the hottest (e.g., most in demand) titles or parts thereof to be prepared that likely would soon be requested by client devices, such as client device 40.

As an example, server device 60 may add an optional attribute @contentRequestRate to manifest file 66 (e.g., an MPD), which may be assigned on Representation, Adaptation Set, and/or MPD level. When present, the value of this attribute indicates content-level or MPD-level relative consumption or request rate among different contents. The value of this attribute may be unitless. A greater value may indicate a higher likelihood that the Representation, Adaptation Set, or Media Presentation will be consumed/requested. Alternatively, a lower value may indicate a higher likelihood or probability of the data being consumed/requested.

Thus, a MANE, DANE, or client device 40 may use the values for this attribute to determine relative likelihoods that, e.g., each of representations 68 will be consumed, and pre-fetch media data of the one of representations 68 having the highest likelihood/probability of being consumed/requested. That is, the MANE/DANE/client device 40 may pre-fetch the corresponding media data, in that the MANE/DANE/client device 40 may retrieve the media data without an explicit request, e.g., from a user (or in the case of a MANE/DANE, from client device 40 or other client devices).

Additionally or alternatively, server device 60 may provide an Adaptation Set and/or Representation-level signaling (e.g., in manifest file 66, such as an MPD) that indicates temporal/time piecewise relative consumption or request rate of a representation among all representations within the same Media Presentation (e.g., representations 68). Client device 40 and/or a MANE/DANE may use this information to pre-fetch the most likely requested pieces of the Media Presentation to be prepared that would likely be requested soon by some client devices, e.g., client device 40. These pieces, e.g., may cover a director's cut representation of a VR/360 video content.

In one example, server device 60 may signal a Representation-level RepRequestRate element, which may be an optional element of manifest file 66. This element may comprise an array of two-attribute pairs of {@repRequestRate, @validTimeEnd}, where @repRequestRate may indicate the relative consumption or request rate within the same Media Presentation (which again may be unitless, and a greater value may mean higher likelihood of the (Sub)

Segments within the time duration as specified below being consumed/requested), and @validTimeEnd may indicate the end, in media timeline, of the time duration within which the relative consumption or request rate value @repRequestRate applies. The start of the time duration may either be the beginning of the current Period or a time indicated by a previous instance of @validTimeEnd. Thus, client device 40, or a MANE/DANE, may determine and pre-fetch one or more segments within the corresponding time from the corresponding representation having the highest probability of being requested/consumed.

Additionally or alternatively, server device 60 may signal the Representation-level information of relative consumption or request rate of the Representation among all Representations within the same Media Presentation (e.g., representations 68) as a fixed value for an entire time duration of the Representation, i.e., not temporal/time piecewise. Thus, client device 40 (or a MANE/DANE) may determine a relative consumption or request rate for an individual representation for an entire duration of the representation.

Additionally or alternatively, server device 60 may signal relative consumption or request rates on one or more of a Period level, an Adaptation Set level, a Representation level, and/or a SubRepresentation level. Client device 40 may be configured to determine that a value for a lower level signaling, if it exists, overwrites any higher level signaling. That is, values may be signaled at two or more of a DASH period level, a DASH adaptation set level, a DASH representation level, or a DASH sub-representation level, and DASH client 40 may determine that values signaled at lower levels supersede values signaled at higher levels. Alternatively, a lower value may indicate a higher likelihood or probability of the data being consumed/requested.

Additionally or alternatively, server device 60 may signal information on a timed metadata level, where server device 60 may provide the metadata as a separate track that can be understood by client device 40 or a MANE/DANE making use of this information. The metadata track may be multiplexed with certain media track in the same Representation or exclusively encapsulated in its own Representation.

As yet another example, server device 60 may signal a new PED message that can carry the relative consumption or request rate information as in described above for a Media Presentation. The message body may carry only the relative consumption or request rate information and an MPD ID that identifies the MPD to which the information applies, but without other parts of the MPD. Alternatively, the PED message body may just carry the MPD itself, which contains the relative consumption or request rate information as well as all other parts of the MPD. The PED message carrying only the relative consumption or rate quest information may be used when all the destinations have access to the MPD, while the PED message carrying the MPD itself may be used when at least one of the destinations does not have access to the MPD.

For example, for MANEs/DANEs that have access to the MPD itself, server device 60 may construct the PED message to include information for updating of the relative consumption or request rates, and the message may include: a value for @mpdId that identifies the MPD to which this message applies; a value for @contentRequestRate as discussed above; and values for an array of {@repId, RepRequestRate}, where @repId is Representation ID, and RepRequestRate is an element with the same syntax and semantics as discussed above. Alternatively, for MANEs/DANEs that do not have access to the MPD itself, then the PED message can contain the MPD itself, with the updated relative consumption or request rate information.

In this manner, client device 40 represents an example of a media device for retrieving media data, the media device including one or more processors configured to receive information indicating at least one data structure of a plurality of data structures that is likely to be of interest to a user, the data structure including media data, and retrieve the media data of the data structure before receiving a request for the media data from the user. In this example, client device 40 may retrieve (that is, pre-fetch) the media data from server device 60.

MANE 76 generally represents a media device that may perform pre-fetch of media data according to the techniques of this disclosure. MANE 76 may include a memory configured to, e.g., store retrieved media data, and one or more processors implemented in circuitry and configured to perform the techniques of this disclosure. Thus, MANE 76 represents an example of a media device for retrieving media data, the media device including one or more processors configured to receive information indicating at least one data structure of a plurality of data structures that is likely to be retrieved by a plurality of user devices operated by a respective plurality of users, the data structure including media data, and retrieve the media data of the data structure before receiving requests for the media data from the user devices. The user devices may include client device 40. MANE 76 may retrieve (that is, pre-fetch) the media data from, e.g., server device 60. In some examples, MANE 76 may be a DASH aware network element (DANE). Additionally, client device 40 may retrieve the media data from MANE 76, instead of from server device 60. Thus, either or both of client device 40 and MANE 76 may apply the techniques of this disclosure to pre-fetch particular media data that may be of interest to a user.

Figure 2:
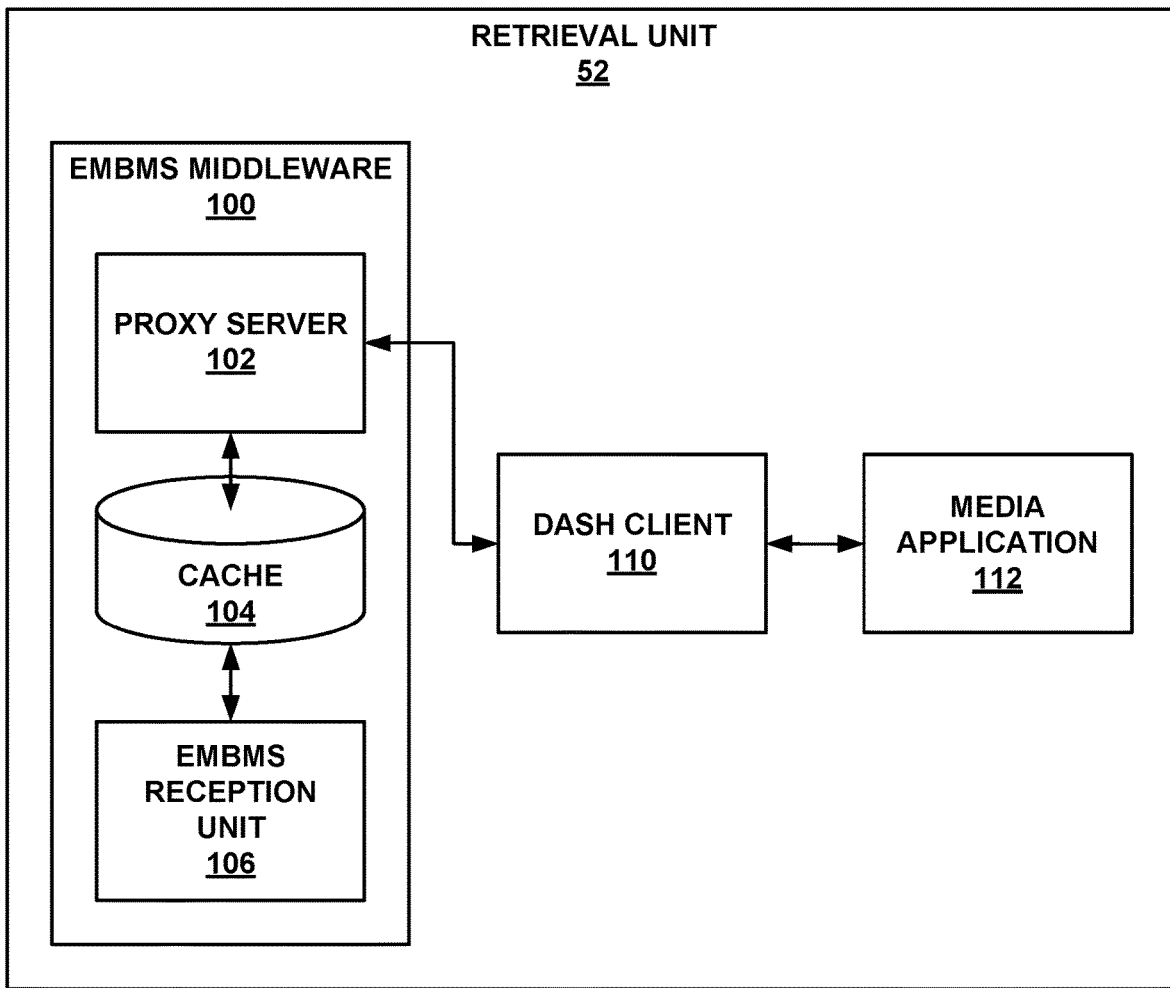
FIG. 2 is a block diagram illustrating an example set of components of a retrieval unit of FIG. 1 in greater detail.

FIG. 2 is a block diagram illustrating an example set of components of retrieval unit 52 of FIG. 1 in greater detail. In this example, retrieval unit 52 includes eMBMS middleware unit 100, DASH client 110, and media application 112.

In this example, eMBMS middleware unit 100 further includes eMBMS reception unit 106, cache 104, and proxy server unit 102. In this example, eMBMS reception unit 106 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at http://tools.ietf.org/html/rfc6726. That is, eMBMS reception unit 106 may receive files via broadcast from, e.g., server device 60, which may act as a BM-SC.

As eMBMS middleware unit 100 receives data for files, eMBMS middleware unit may store the received data in cache 104. Cache 104 may comprise a computer-readable storage medium, such as flash memory, a hard disk, RAM, or any other suitable storage medium.

Proxy server unit 102 may act as a server for DASH client 110. For example, proxy server unit 102 may provide a MPD file or other manifest file to DASH client 110. Proxy server unit 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from local server unit 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to proxy server unit 102. Proxy server unit 102 may retrieve requested data from cache 104 and provide the data to DASH client 110 in response to such requests. DASH client 110 delivers media data retrieved from proxy server unit 102 to media application 112 for playback.

In accordance with certain examples of the techniques of this disclosure, eMBMS middleware unit 100 may receive media data that is most likely to be presented to a user via eMBMS (e.g., via broadcast/multicast), whereas retrieval unit 52 (see FIG. 1) (e.g., either eMBMS middleware unit 100 or DASH client 110) may retrieve other media data that is not as likely to be presented to the user via unicast.

Figure 3:
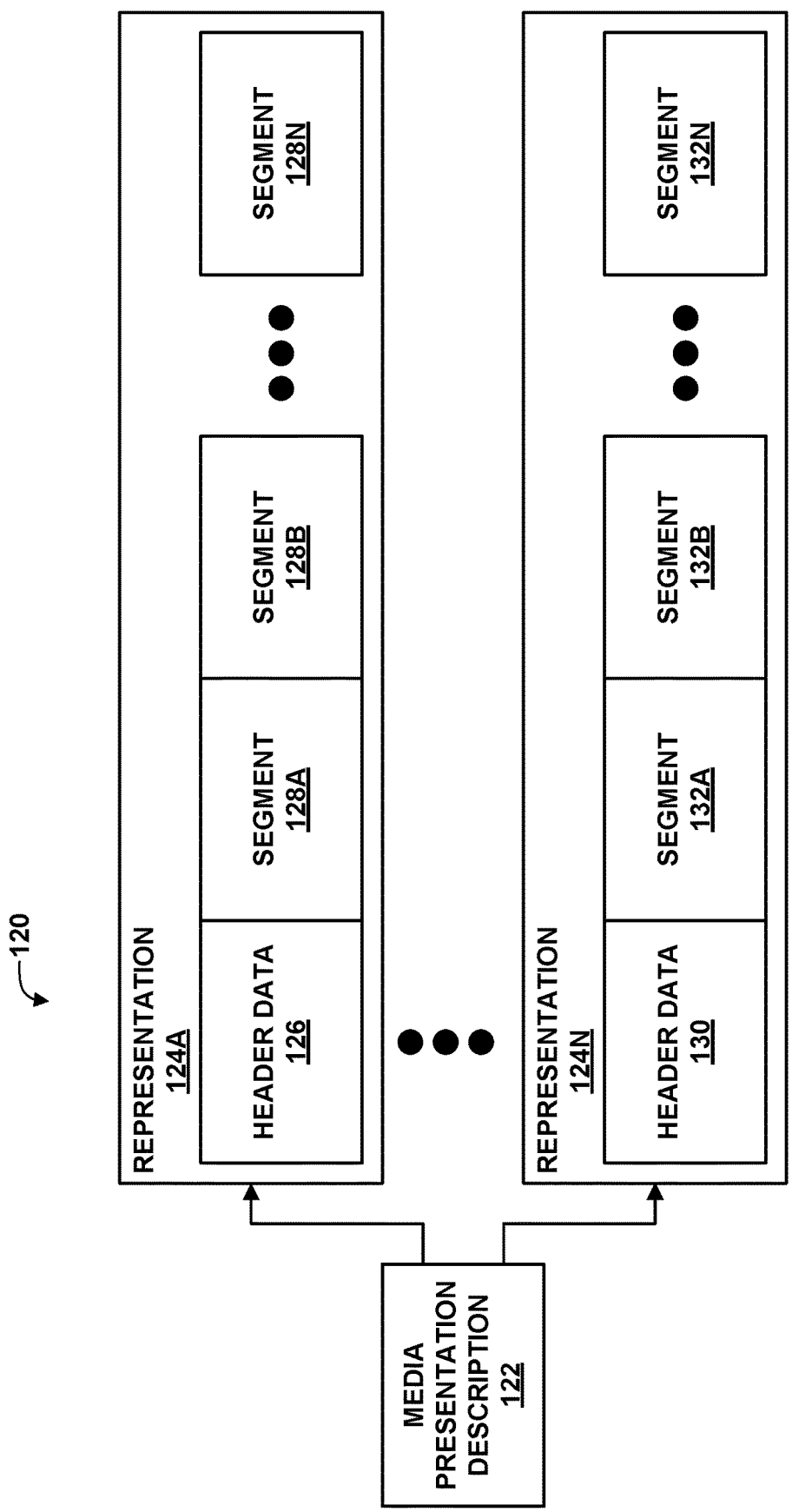
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 2. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

MPD 122 generally signals characteristics about various data structures at various levels. For example, MPD 122 signals characteristics about adaptation sets including a plurality of representations, the representations themselves, groups of segments within a representation, and individual segments. MPD 122 may be formed as an Extensible Markup Language (XML) document, including recursive sets of tags. Thus, an adaptation set level may be formed using an adaptation set tag, a representation set level may be formed using a representation tag within an adaptation set, a group of segments level may be formed using a group of segments tag within a representation, and a segment level may be formed using a segment tag within a group of segments or within a representation.

In accordance with the techniques of this disclosure, MPD 122 may include information indicating at least one data structure of a plurality of data structures that is likely to be of interest to a user, the data structure including media data. For example, the data structure may be a media presentation, an adaptation set, a representation, or sub-section of a representation (e.g., set of one or more segments or sub-segments).

As discussed above, MPD 122 may include a RepRequestRate element including an array of two-attribute pairs of {@repRequestRate, @validTimeEnd}. In this example, a unitless value for @repRequestRate may indicate a relative consumption or request rate within the same media presentation for a corresponding representation, and a value for @validTimeEnd may indicate a media timeline end time for a time duration within which the value @repRequestRate applies.

In some examples, MPD 122 may include a value for a syntax element representing a relative consumption or request rate of a corresponding representation among all representations within the same media presentation for an entire time duration of the representation. The syntax element may correspond to all representations within the same media presentation for one or more of a DASH period, a DASH adaptation set, a DASH representation, or a DASH sub-representation.

In some examples, MPD 122 may include data representing temporal piecewise relative consumption or request rates of data from an adaptation set among all adaptation sets within the same media presentation.

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 3. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

Figure 4:
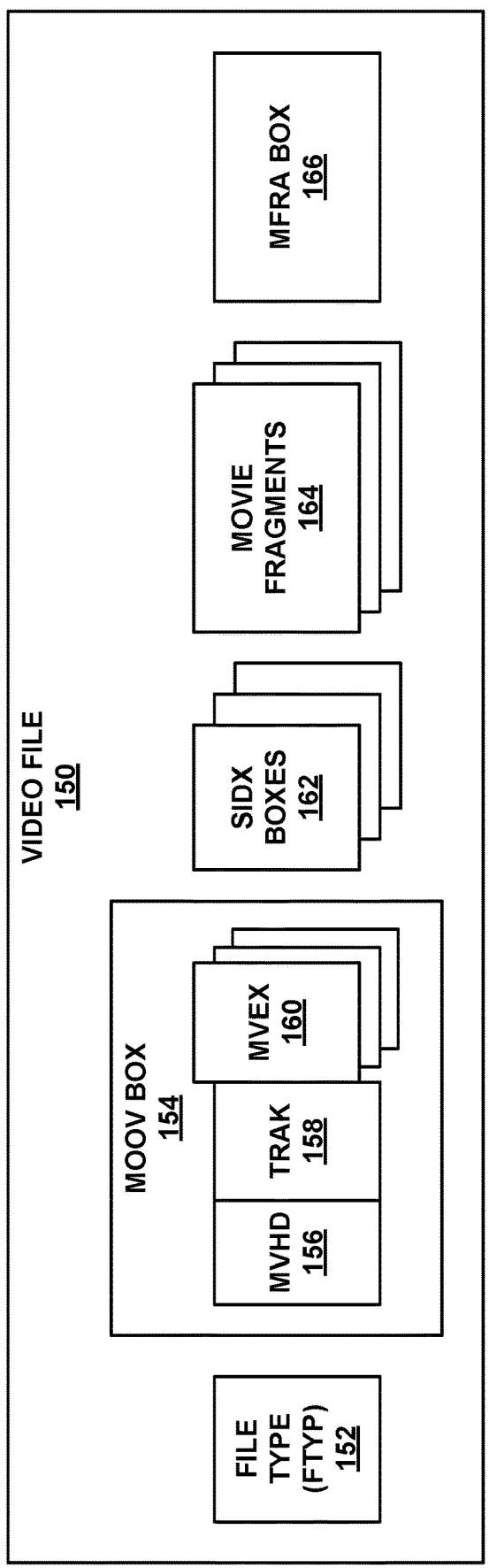
FIG. 4 is a block diagram illustrating elements of an example video file, which may correspond to a segment of a representation.

FIG. 4 is a block diagram illustrating elements of an example video file 150, which may correspond to a segment of a representation, such as one of segments 128, 132 of FIG. 3. Each of segments 128, 132 may include data that conforms substantially to the arrangement of data illustrated in the example of FIG. 4. Video file 150 may be said to encapsulate a segment. As described above, video files in accordance with the ISO base media file format and extensions thereof store data in a series of objects, referred to as "boxes." In the example of FIG. 4, video file 150 includes file type (FTYP) box 152, movie (MOOV) box 154, segment index (sidx) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may, in various alternatives, be placed immediately before MOOV box 154, movie fragment boxes 164, or MFRA box 166.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150.

MOOV box 154, in the example of FIG. 4, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In accordance with the techniques of this disclosure, TRAK box 158 may include information indicating at least one data structure of a plurality of data structures that is likely to be retrieved by a plurality of user devices operated by a respective plurality of users, the data structure including media data. For example, TRAK box 158 may include a multiplexed plurality of tracks, the plurality of tracks including media tracks for movie fragments 164 and a separate track having syntax elements signaled on a timed metadata level that specify the information indicating the at least one data structure of the plurality of data structures that is likely to be retrieved. The data structure may comprise, for example, one or more of movie fragments 164. In some examples, the separate track may be formed as a representation that does not include any media data and multiplexed with other tracks including respective representations that do include media data.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 3) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above with respect to FIG. 1, encapsulation unit 30 may store a sequence data set in a video sample that does not include actual coded video data. A video sample may generally correspond to an access unit, which is a representation of a coded picture at a specific time instance. In the context of AVC, the coded picture includes one or more VCL NAL units which contain the information to construct all of the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, an indication of whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 5:
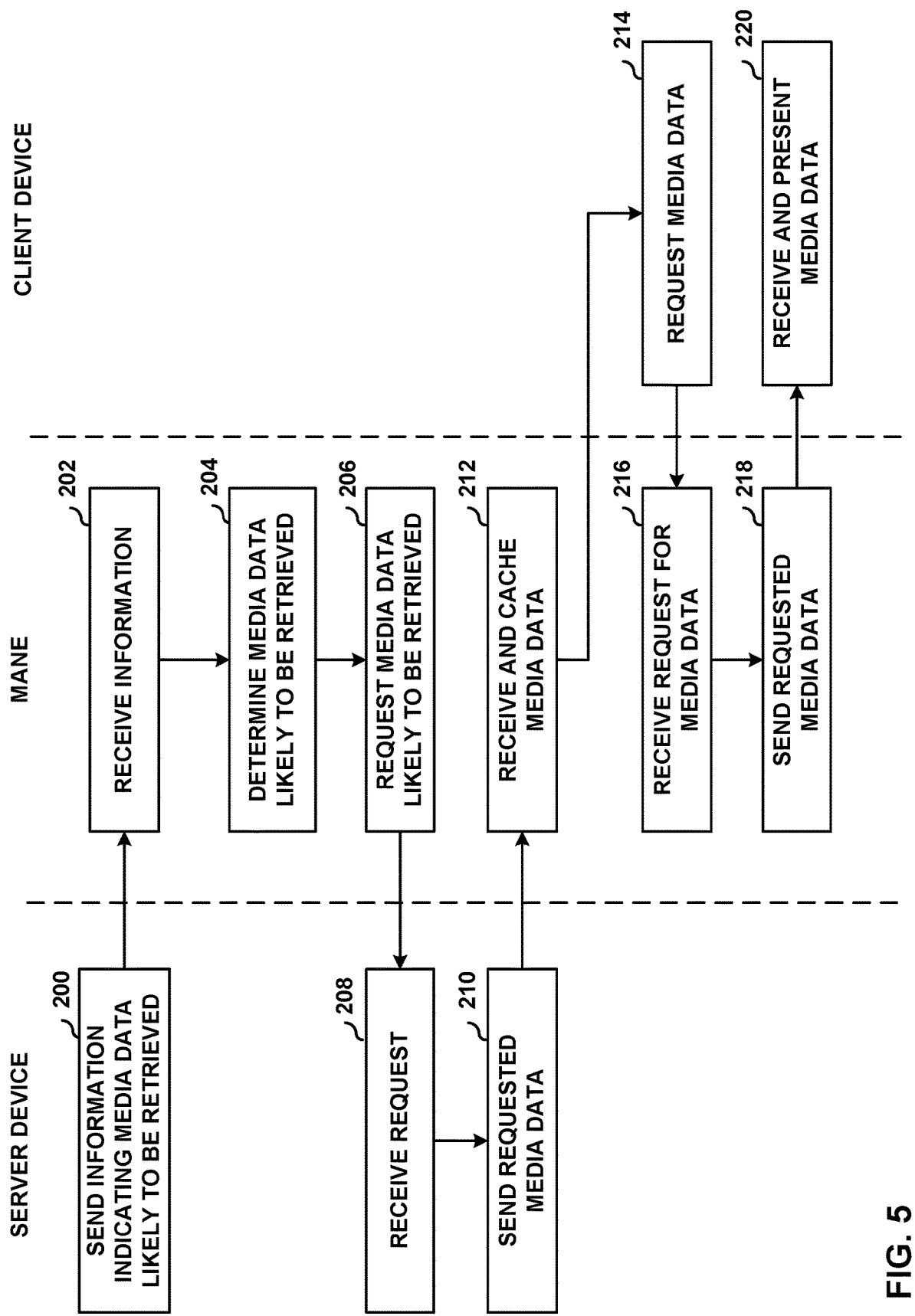
FIG. 5 is a flowchart illustrating an example method for performing the techniques of this disclosure.

FIG. 5 is a flowchart illustrating an example method for performing the techniques of this disclosure. The method of FIG. 5 is explained with respect to server device 60, MANE 76, and client device 40 of FIG. 1. However, it should be understood that this or a similar method may be performed by other devices, e.g., in addition or in the alternative to server device 60, MANE 76, and client device 40. For example, the pre-fetch techniques attributed to MANE 76 may instead be performed by client device 40 itself. As another example, content preparation device 20 may perform the techniques attributed to server device 60. In this example, client device 40 represents one of a plurality of user devices (e.g., user equipment (UE)), which may each be operated by a respective different user.

Initially, in this example, server device 60 sends information indicating media data that is likely to be retrieved by a plurality of users (200), e.g., users of client devices such as client device 40. This information may indicate one or more titles (that is, individual movies, also referred to as media presentations), adaptation sets of a media presentation, representations of a media presentation, and/or segments, groups of segments, or sub-segments of a media presentation. As discussed above, such information may be included in a manifest file, such as a DASH MPD, e.g., at an MPD level, an adaptation set level, a representation level, a segment level, or the like. Additionally or alternatively, this information may be included in a track that is multiplexed with other tracks of a video file. Additionally or alternatively, this information may be included in a special PED message, e.g., that particularly identifies an MPD to which the PED message applies, a relative consumption or request rate for a media presentation corresponding to the MPD, and/or data indicating relative consumption or request rates for one or more representations of the media presentation.

In this example, MANE 76 receives the information (202) and uses the information to determine the media data that is likely to be retrieved (204). For example, MANE 76 may extract the information from an MPD, a special PED message, or a separate track of a media file. MANE 76 may then request the media data that is likely to be retrieved (206). In particular, MANE 76 may pre-fetch the media data that is likely to be retrieved. That is, in this example, MANE 76 retrieves the media data that is likely to be retrieved before any of the plurality of client devices (e.g., client device 40) requests the media data. In other words, MANE 76 retrieves the media data using the information indicating that the media data that is likely to be retrieved, not in response to requests from client device 40 (or other client devices).

Server device 60 receives the request for the media data (208) and, in response to the request, sends the requested media data to MANE 76 (210), in this example. MANE 76 receives and caches the media data (212), e.g., in a memory of MANE 76 configured as a cache. In this manner, MANE 76 has the media data that is likely to be retrieved by client devices before the client devices have actually requested the media data. Accordingly, MANE 76 may serve requests for the media data from the cache of MANE 76, rather than retrieving the media data from server device 60 after receiving a request for the media data.

In particular, as shown in the example of FIG. 5, client device 40 requests the media data that is likely to be retrieved (214). MANE 76 receives the request for the media data from client device 40 (216). Because MANE 76 pre-fetched the media data, MANE 76 can send the requested media data to client device 40 (218), without retrieving the media data from server device 60 after receiving the request from client device 40. Client device 40 may then receive and present the media data (220). In this manner, the techniques of this disclosure may reduce latency of responding to requests for media data. Reducing latency in this manner may improve users' experiences, and also reduce processing required by MANE 76. In particular, by caching the media data that is likely to be retrieved through pre-fetching such media data, MANE 76 may ensure that this data is available for a plurality of users, and therefore, reduce the number of times MANE 76 must retrieve the media data from server device 60 in order to serve the media data to the plurality of users.

In this manner, the method of FIG. 5 represents an example of a method including receiving, by a media device, information indicating at least one data structure of a plurality of data structures that is likely to be retrieved by a plurality of user devices operated by a respective plurality of users, the data structure including media data, and retrieving, by the media device, the media data of the data structure before receiving requests for the media data from the user devices.

As discussed above, the method of FIG. 5 is explained, for purposes of example, with respect to MANE 76 pre-fetching media data. In other examples, client device 40 may pre-fetch media data, e.g., from MANE 76 or server device 60, before receiving a request from a user of client device 40 in a similar manner.

Figure 6:
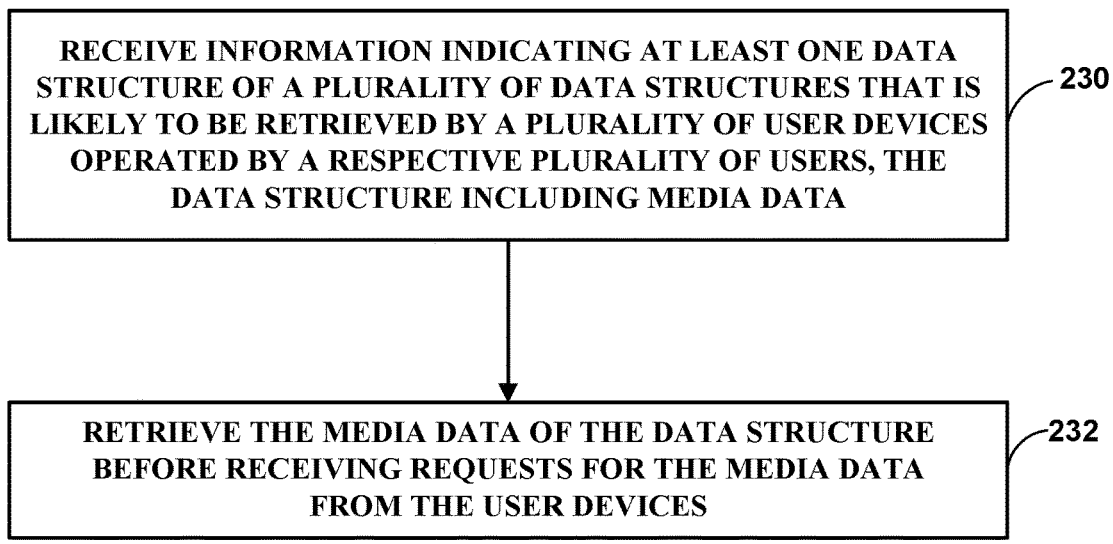
FIG. 6 is a flowchart illustrating an example method for performing the techniques of this disclosure.

FIG. 6 is a flowchart illustrating an example method for performing the techniques of this disclosure. The method of FIG. 6 is explained with respect to server MANE 76 of FIG. 1, for purposes of example. However, it should be understood that this or a similar method may be performed by other devices, e.g., in addition or in the alternative to MANE 76. For example, client device 40 of FIG. 1 may perform this or a similar method. Likewise, server device 60 may perform a conceptually similar, albeit reciprocal, method to that shown in FIG. 6. That is, server device 60 may send the information indicated as being received and retrieved by MANE 76 in FIG. 6.

Initially, MANE 76 receives information indicating at least one data structure of a plurality of data structures that is likely to be retrieved by a plurality of user devices operated by a respective plurality of users, the data structure including media data (230). MANE 76 then retrieves the media data of the data structure before receiving requests for the media data from the user devices (232). That is, MANE 76 retrieves the media data without initially receiving requests for the media data from the client devices, i.e., not in response to any requests for the media data from the client devices. In this manner, MANE 76 may prefetch the media data before the media data is requested by the client devices, such that the media data is available for distribution to the client devices in the event of requests for the media data from the client devices. When performed by a client device, such as client device 40 (FIG. 1), the method of FIG. 6 generally includes client device 40 retrieving the media data before receiving any requests for the media data from a user of client device 40 (i.e., not in response to a request for the media data from the user).

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of retrieving media data, the method comprising:

receiving, by a media device, a Parameters Enhancing Delivery (PED) message including information indicating request rates for each of a plurality of data structures of a common media content, each of the data structures including media data, the information indicating that a first data structure of the plurality of data structures has a first request rate and that a second, different data structure of the plurality of data structures has a second, different request rate, wherein receiving the information comprises receiving the information from a device separate from the plurality of user devices and separate from the media device, the information of the PED message indicating the request rates being separate from a manifest file for the plurality of data structures;

determining that the first request rate is higher than the second request rate;

in response to determining that the first request rate is higher than the second request rate, determining that the first data structure is more likely to be retrieved by a plurality of user devices operated by a respective plurality of users than the second data structure; and in response to the determination that the first data structure is more likely to be retrieved by the plurality of user devices than the second data structure, retrieving, by the media device, the media data of the first data structure before receiving requests for the media data of the first data structure from the user devices, without retrieving the media data of the second data structure before receiving requests for the media data of the second data structure from the user devices.

2. The method of claim 1, wherein the media device comprises a media aware network element (MANE) in communication with a server device and the plurality of user devices.

3. The method of claim 1, wherein the media device comprises a Dynamic Adaptive Streaming over HTTP (DASH) aware network element (DANE).

4. The method of claim 1, wherein the first data structure comprises one of a Dynamic Adaptive Streaming over HTTP (DASH) representation, a DASH adaptation set, or a set of media presentations including a plurality of related DASH representations and corresponding to a particular movie title.

5. The method of claim 1, wherein the manifest file comprises a Dynamic Adaptive Streaming over HTTP (DASH) Media Presentation Description (MPD).

6. The method of claim 1, wherein the media device comprises a media aware network element (MANE) or a DASH aware network element (DANE), the method further comprising extracting the information from the PED message and updating relative consumption or request rates using the extracted information.

7. The method of claim 1, wherein the PED message includes a value for an @mpdId element that identifies a media presentation description (MPD) to which the PED message applies, a value for an @contentRequestRate element indicating a relative consumption or request rate for media data corresponding to the MPD, and an array of {@repId, RepRequestRate} syntax elements indicating relative consumption or request rates for respective representations, wherein the manifest file comprises the MPD, and wherein the request rates comprise the array of {@repId, RepRequestRate} syntax elements.

8. The method of claim 1, wherein the PED message includes a DASH MPD for the media data, the manifest file comprising the DASH MPD.

9. The method of claim 1, wherein the request rates comprise values for a @contentRequestRate attribute for the data structures, the @contentRequestRate attribute indicating consumption or request rates for the respective data structures.

10. The method of claim 9, wherein the @contentRequestRate attribute has a unitless value that indicates a content-level or manifest-file-level consumption or request rate for a corresponding data structure, and wherein a higher value for the @contentRequestRate attribute indicates that the corresponding data structure is more likely to be consumed or requested than data structures having lower @contentRequestRate attribute values.

11. The method of claim 9, wherein the @contentRequestRate attribute has a unitless value that indicates a content-level or manifest-file-level consumption or request rate for a corresponding data structure, and wherein a lower value for the @contentRequestRate attribute indicates that the corresponding data structure is more likely to be consumed or requested than data structures having higher @contentRequestRate attribute values.

12. The method of claim 1, wherein the first data structure comprises an adaptation set or a representation, and wherein receiving the information comprises receiving the information at an adaptation set level or a representation level.

13. The method of claim 12, wherein the information indicates temporal piecewise relative consumption or a request rate of a representation among all representations within the same media presentation.

14. The method of claim 12, wherein the information comprises a RepRequestRate element including an array of two-attribute pairs of {@repRequestRate, @validTimeEnd} comprising the request rates, wherein a unitless value for @repRequestRate indicates a relative consumption or request rate within the same media presentation for a corresponding representation, and wherein a value for @validTimeEnd indicates a media timeline end time for a time duration within which the value @repRequestRate applies.

15. The method of claim 12, wherein the information comprises a value representing a relative consumption or request rate of a corresponding representation among all representations within the same media presentation for an entire time duration of the representation.

16. The method of claim 12, wherein the information comprises a value for a syntax element representing a relative consumption or request rate of a corresponding representation among all representations within the same media presentation for one or more of a DASH period, a DASH adaptation set, a DASH representation, or a DASH sub-representation.

17. The method of claim 16, wherein the information comprises values for syntax elements signaled at two or more of a DASH period level, a DASH adaptation set level, a DASH representation level, or a DASH sub-representation level, the method further comprising determining that values signaled at lower levels supersede values signaled at higher levels.

18. The method of claim 16, further comprising determining that a higher value for the syntax element representing the relative consumption or request rate indicates that the corresponding representation is more likely to be retrieved than representations having lower values for the syntax element.

19. The method of claim 12, wherein receiving the information comprises receiving values for syntax elements signaled on a timed metadata level from a separate track multiplexed with one or more media tracks.

20. The method of claim 19, wherein extracting the values comprises extracting the values from the separate track that is multiplexed with a representation.

21. The method of claim 19, wherein extracting the values comprises extracting the values from the separate track that is encapsulated in a representation that does not include media data.

22. The method of claim 12, wherein the information indicates temporal piecewise relative consumption or request rates of data from an adaptation set among all adaptation sets within the same media presentation.

23. The method of claim 12, wherein receiving the information at the adaptation set or representation level comprises extracting the information from a manifest file.

24. The method of claim 1, wherein retrieving the media data comprises pre-fetching the media data.

25. A media device for retrieving media data, the media device comprising:
a memory for storing media data; and
one or more processors implemented in circuitry and configured to:
receive a Parameters Enhancing Delivery (PED) message including information indicating request rates for each of a plurality of data structures of a common media content, each of the data structures including media data, the information indicating that a first data structure of the plurality of data structures has a first request rate and that a second, different data structure of the plurality of data structures has a second, different request rate, wherein receiving the information comprises receiving the information from a device separate from the plurality of user devices and separate from the media device, the information of the PED message indicating the request rates being separate from a manifest file for the plurality of data structures;

determine that the first request rate is higher than the second request rate;

in response to determining that the first request rate is higher than the second request rate, determine that the first data structure is more likely to be retrieved by a plurality of user devices operated by a respective plurality of users than the second data structure; and in response to the determination that the first data structure is more likely to be retrieved by the plurality of user devices than the second data structure, retrieve the media data of the first data structure before receiving requests for the media data of the first data structure from the user devices, without retrieving the media data of the second data structure before receiving requests for the media data of the second data structure from the user devices.

26. The media device of claim 25, wherein the first data structure comprises one of a Dynamic Adaptive Streaming over HTTP (DASH) representation, a DASH adaptation set, or a set of media presentations including a plurality of related DASH representations corresponding to a particular movie title.

27. The media device of claim 25, wherein the manifest file comprises a Dynamic Adaptive Streaming over HTTP (DASH) Media Presentation Description (MPD).

28. The media device of claim 25, wherein the media device comprises a media aware network element (MANE) or a DASH aware network element (DANE), and wherein the one or more processors are further configured to extract the information from the PED message and update relative consumption or request rates using the extracted information.

29. The media device of claim 25, wherein the PED message includes a value for an @mpdId element that identifies a media presentation description (MPD) to which the PED message applies, a value for an @contentRequestRate element indicating a relative consumption or request rate for media data corresponding to the MPD, and an array of {@repId, RepRequestRate} syntax elements indicating relative consumption or request rates for respective representations, wherein the manifest file comprises the MPD, and wherein the request rates comprise the array of {@repId, RepRequestRate} syntax elements.

30. The media device of claim 25, wherein the first data structure comprises an adaptation set or a representation, and wherein the one or more processors are configured to extract the information from an adaptation set level or a representation level of a manifest file.

31. The media device of claim 25, wherein the one or more processors are configured to pre-fetch the media data of the first data structure.

32. The media device of claim 25, further comprising a display configured to display a picture of the media data.

33. The media device of claim 25, wherein the media device comprises one or more of a camera, a computer, a mobile device, a broadcast receiver device, or a set-top box.

34. The media device of claim 25, wherein the media device comprises a media aware network element (MANE).

35. The media device of claim 25, wherein the media device comprises a Dynamic Adaptive Streaming over HTTP (DASH) aware network element (DANE).

36. A media device for retrieving media data, the media device comprising:

means for receiving a Parameters Enhancing Delivery (PED) message including information indicating request rates for each of a plurality of data structures of a common media content, each of the data structures including media data, the at least one data structure comprising a first data structure, and the information indicating that a first data structure of the plurality of data structures has a first request rate and that a second, different data structure of the plurality of data structures has a second, different request rate, wherein receiving the information comprises receiving the information from a device separate from the plurality of user devices and separate from the media device, the information of the PED message indicating the request rates being separate from a manifest file for the plurality of data structures;

means for determining that the first request rate is higher than the second request rate;

means for determining, in response to determining that the first request rate is higher than the second request rate, that the first data structure is more likely to be retrieved by a plurality of user devices operated by a respective plurality of users than the second data structure; and means for retrieving the media data of the first data structure before receiving requests for the media data of the first data structure from the user devices in response to the information indicating that the first data structure is more likely to be retrieved by the plurality of user devices than the second data structure, without retrieving the media data of the second data structure before receiving requests for the media data of the second data structure from the user devices.

37. A computer-readable storage medium having stored thereon instructions that, when executed, cause a processor of a media device to:

receive a Parameters Enhancing Delivery (PED) message including information indicating request rates for each of a plurality of data structures of a common media content, each of the data structures including media data, the information indicating that a first data structure of the plurality of data structures has a first request rate and that a second, different data structure of the plurality of data structures has a second, different request rate, wherein receiving the information comprises receiving the information from a device separate from the plurality of user devices and separate from the media device, the information of the PED message indicating the request rates being separate from a manifest file for the plurality of data structures;

determine that the first request rate is higher than the second request rate;

in response to determining that the first request rate is higher than the second request rate, determine that the first data structure is more likely to be retrieved by a plurality of user devices operated by a respective plurality of users than the second data structure; and in response to the information indicating that the first data structure is more likely to be retrieved by the plurality of user devices than the second data structure, retrieve the media data of the first data structure before receiving requests for the media data of the first data structure from the user devices, without retrieving the media data of the second data structure before receiving requests for the media data of the second data structure from the user devices.

\* \* \* \* \*